(12) United States Patent
Park et al.

(10) Patent No.: US 8,498,337 B2
(45) Date of Patent: Jul. 30, 2013

(54) METHOD FOR DECODING AND ENCODING A VIDEO SIGNAL

(75) Inventors: Seung Wook Park, Seoul (KR); Byeong Moon Jeon, Seoul (KR); Dong Seok Kim, Seoul (KR); Ji Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 12/926,099

(22) Filed: Oct. 26, 2010

(65) Prior Publication Data

US 2011/0110434 A1       May 12, 2011

Related U.S. Application Data

(63) Continuation of application No. 11/992,942, filed as application No. PCT/KR2006/004029 on Oct. 9, 2006, now abandoned.

(30) Foreign Application Priority Data

Oct. 2, 2006   (KR) .................. 10-2006-0097359

(51) Int. Cl.
    *H04N 7/32*        (2006.01)
(52) U.S. Cl.
    USPC ................................. 375/240.12; 375/240.24
(58) Field of Classification Search
    USPC ........................... 375/240.14, 240.12, 240.24
    See application file for complete search history.

(56) References Cited

U.S. PATENT DOCUMENTS

| 5,818,531 | A  | 10/1998 | Yamaguchi et al. |
| 5,973,739 | A  | 10/1999 | Nilsson |
| 6,292,512 | B1 | 9/2001  | Radha et al. |
| 6,330,280 | B1 | 12/2001 | Suzuki et al. |
| 6,339,618 | B1 | 1/2002  | Puri et al. |
| 6,498,865 | B1 | 12/2002 | Brailean et al. |
| 6,510,177 | B1 | 1/2003  | De Bonet et al. |
| 6,535,559 | B2 | 3/2003  | Suzuki et al. |

(Continued)

FOREIGN PATENT DOCUMENTS

| JP | 6-209468     | 7/1994 |
| JP | 2005168017 A | 6/2005 |

(Continued)

OTHER PUBLICATIONS

Segall, Andrew, "SVC-to-AVC Bit-stream Rewriting for Coarse Scalability", 20th Meeting of JVT, Klagenfurt, Austria, Jul. 15-21, 2005.*

(Continued)

*Primary Examiner* — David Harvey
(74) *Attorney, Agent, or Firm* — Harness, Dickey & Pierce

(57) ABSTRACT

In one embodiment, the method for decoding a video signal using inter layer prediction includes obtaining a residual signal of a corresponding block in a base layer from a base layer bitstream, scaling the residual signal of the corresponding block in the base layer, obtaining a residual signal of a current block in an enhanced layer from an enhanced layer bitstream, obtaining a prediction pixel value of the current block in the enhanced layer based on an intra prediction mode of the corresponding block in the base layer and a pixel value of a neighboring block in the enhanced layer, and reconstructing the current block by using the prediction pixel value of the current block, the residual signal of the current block.

5 Claims, 5 Drawing Sheets

U.S. PATENT DOCUMENTS

| | | | |
|---|---|---|---|
| 6,614,936 B1 | 9/2003 | Wu et al. | |
| 6,639,943 B1 | 10/2003 | Radha et al. | |
| 6,765,965 B1 | 7/2004 | Hanami et al. | |
| 6,907,070 B2 | 6/2005 | Wu et al. | |
| 6,940,905 B2 | 9/2005 | Van Der Schaar et al. | |
| 7,072,394 B2 | 7/2006 | Huang et al. | |
| 8,315,308 B2* | 11/2012 | Bao et al. | 375/240.12 |
| 2002/0037046 A1 | 3/2002 | Schaar et al. | |
| 2002/0118742 A1 | 8/2002 | Puri et al. | |
| 2003/0007557 A1 | 1/2003 | Katata et al. | |
| 2003/0156646 A1 | 8/2003 | Hsu et al. | |
| 2003/0223493 A1 | 12/2003 | Ye et al. | |
| 2003/0223643 A1 | 12/2003 | Van Der Schaar | |
| 2004/0001635 A1 | 1/2004 | Van Der Schaar | |
| 2004/0252900 A1 | 12/2004 | Bruls | |
| 2005/0011543 A1 | 1/2005 | Haught et al. | |
| 2005/0053148 A1 | 3/2005 | Mukerjee | |
| 2005/0111543 A1 | 5/2005 | Seo | |
| 2005/0185714 A1 | 8/2005 | Lin et al. | |
| 2005/0195896 A1 | 9/2005 | Huang et al. | |
| 2005/0195900 A1 | 9/2005 | Han | |
| 2006/0013308 A1 | 1/2006 | Kim | |
| 2006/0083309 A1 | 4/2006 | Schwarz et al. | |
| 2006/0233242 A1 | 10/2006 | Wang et al. | |
| 2006/0256863 A1 | 11/2006 | Wang et al. | |
| 2007/0053442 A1 | 3/2007 | Ridge et al. | |
| 2007/0160136 A1 | 7/2007 | Lee et al. | |
| 2008/0031345 A1* | 2/2008 | Segall | 375/240.19 |
| 2008/0044094 A1 | 2/2008 | Jeon et al. | |
| 2010/0296000 A1 | 11/2010 | Henocq et al. | |
| 2011/0038421 A1 | 2/2011 | Schwarz et al. | |

FOREIGN PATENT DOCUMENTS

| | | |
|---|---|---|
| KR | 10-2000-0070003 | 11/2000 |
| KR | 10-2002-0090239 | 11/2002 |
| KR | 10-2003-0078772 | 10/2003 |
| KR | 10-2003-0086100 | 11/2003 |
| KR | 10-2006-0034192 | 4/2006 |
| KR | 10-2006-0043115 | 5/2006 |
| KR | 10-2006/0063533 | 6/2006 |
| KR | 100703788 B1 | 4/2007 |
| WO | WO 01/39503 A1 | 5/2001 |
| WO | WO 01/49036 A1 | 7/2001 |
| WO | WO 03/075578 A2 | 9/2003 |
| WO | WO 2004/030368 A1 | 4/2004 |
| WO | WO 2005/032138 A1 | 4/2005 |
| WO | WO 2006-078142 | 7/2006 |
| WO | WO 2006-132509 | 12/2006 |
| WO | WO 2007/040336 A1 | 4/2007 |
| WO | WO 2007/040370 A1 | 4/2007 |

OTHER PUBLICATIONS

US Office Action dated Dec. 22, 2010, issued in U.S. Appl. No. 11/992,763.
Woo-Jin Han, Smoothed reference prediction for single-loop decoding, Jul. 2005, Joint Video Team (JVT) of ISO/IEC MPEG & ITU-TVCEG (ISO/IEC JTC1/SC29/WG11 and ITU-T SG16 Q.6, p. 1-14.
Office Action dated Feb. 8, 2011 in corresponding Japenese Patent Application No. 2008-534442.
U.S. Office Action dated Apr. 15, 2011 for U.S. Appl. No. 11/543,080.
Office Action dated Feb. 9, 2011, in corresponding Japanese Patent Application No. 2008-534461.
U.S. Office Action dated May 12, 2011 for U.S. Appl. No. 11/543,032.
Office Action dated May 6, 2011 in corresponding U.S. Appl. No. 11/543,031.
Office Action dated Jun. 7, 2011 in corresponding U.S. Appl. No. 11/543,130.
Search Report dated Jan. 28, 2010 by the European Patent Office for counterpart European Application No. 06799109.
Han, Woo-Jin "Smoothed reference prediction for single-loop decoding", JVT-P983, Poland, Jul. 2005.
Reichel, J. et al—"Joint Scalable Video Model JSVM-2", JVT O292, Korea, Apr. 2005.
Bao, Y. et al. "A low-complexity AVC/based scalable video codec", ISO/IEC JTC1/SC29/WG11, Hong Kong, Jan. 2005.
Office Action dated Jun. 1, 2009 for corresponding Australian Application.
"The MPEG-4 Fine-Grained Scalable Video Coding Method for Multimedia Streaming over IP" IEEE Transactions on Multimedia, vol. 3 No. 1, Mar. 2001.
Office Action for corresponding Korean Application No. 2008-7008031 dated Apr. 10, 2009.
Office Action for corresponding Korean Application No. 2006-97359 dated Mar. 10, 2009.
Office Action for corresponding Korean Application No. 2006-97360 dated Mar. 12, 2009.
Office Action for corresponding Korean Application No. 2006-95950 dated Jan. 16, 2009.
International Search Report (PCT/ISA/210 and PCT/ISA/220).
Written Opinion (PCT/ISA/237).
International Search Report dated Jan. 18, 2007.
International Search Report dated Jan. 22, 2007.
International Search Report dated Jan. 29, 2007.
International Search Report dated Jan. 31, 2007.
International Search Report dated Jun. 14, 2007.
Korean Office Action dated Sep. 25, 2005.
Mihaela Van Der Schaar and Hayder Radha "Adaptive motion-compensation fine-granular-scalability (AMC-FGS) for wireless video", IEEE Transactions on Circuits and Systems for Video Technology, vol. 12, No. 6, pp. 360-371, Jun. 2002.
J.R. Ohm, "Advances in scalable video coding", Proc. of the IEE, vol. 93, No. 1, pp. 42-56, Jan. 2005.
H.Kimata et al, Hierarchical reference picture selection method for temporal scalability beyond H.264, in Proc. IEEE Int'l Conf. Multimedia and Expo, vol. 1, pp. 181-184, Jun. 27-30, 2004.
T. Yang et al., An adaptive key-frame reference picture selection algorithm for video transmission via error prone networks, in Proc. Autonomous Decentralized Systems, pp. 367-371, Apr. 4-8, 2005.
Search Report dated Aug. 11, 2010 by the European Patent Office for counterpart Application No. 06799109.
U.S. Office Action dated Sep. 14, 2011 issued in corresponding U.S. Appl. No. 11/543,031.
U.S. Office Action dated Sep. 6, 2011 in corresponding U.S. Appl. No. 11/543,032.
Search Report for corresponding European Application No. 06799078.8 dated Dec. 20, 2012.
Ridge J et al: "FGS coding efficiency enhancements", 15. JVT Meeting; 72. MPEG Meeting; Apr. 16-22, 2005; Busan, KR; (Joint Video Team of ISO/IEC JTC1/SC29/WG11 and ITU-T SG.16),, No. JVT-0055, Apr. 14, 2005, XP030006000, ISSN: 0000-0417.
Justin Ridge et al: "FGS block enhancements for scalable video coding", 70. MPEG Meeting; Oct. 18-22, 2004; Palma De Mallorca; (Motionpicture Expert Group or ISO/IEC JTC1/SC29/WG11),, No. M11428, Oct. 14, 2004, XP030040202, ISSN: 0000-0251.
Bao Y et al: "Improvements of Fine Granularity Scalability for Low-Delay Applications", 15. JVTmeeting; 72. MPEG Meeting; Apr. 16-22, 2005; Busan, KR; (Joint Video Team of ISO/IEC JTC1/SC29. WG11 and ITU-T SG.16),. No. JVT-0054r1, Apr. 17, 2005, XP0300059999, ISSN: 0000-0417.

* cited by examiner

METHOD FOR DECODING AND ENCODING A VIDEO SIGNAL

PRIORITY INFORMATION

This application is a continuation of U.S. application Ser. No. 11/992,942 filed Apr. 1, 2008 now abandoned, which is a U.S. National Stage Application of PCT Application No. PCT/KR2006-004029 filed Oct. 9, 2006, and claims the benefit of priority to Korean Application No. 10-2006-097359 filed in the Korean Patent Office on Oct. 2, 2006, U.S. Provisional Application No. 60/723,474 filed Oct. 5, 2005 and U.S. Provisional Application No. 60/729,220 filed Oct. 24, 2005; the entire contents of U.S. application Ser. No. 11/992,942, PCT Application No. PCT/KR2006-004029, Korean Application No. 10-2006-097359, U.S. Provisional Application No. 60/723,474, and U.S. Provisional Application No. 60/729,220 are hereby incorporated by reference in their entirety.

TECHNICAL FIELD

The present invention relates to a method for decoding/encoding a video signal, and more particularly to a method for decoding/encoding a video signal using an inter-layer prediction process.

BACKGROUND ART

Generally, a Moving Picture Experts Group (MPEG) under ISO/IEC (International Organization for Standardization/International Electro-technical Commission) and a Video Coding Experts Group (VCEG) under ITU-T (International Telecommunications Union-Telecommunication Standardization sector) have jointly configured a Joint Video Team (JVT), such that they have proposed a new standard capable of implementing a video image compression performance superior to those of the MPEG-4 Part 2 standard and the H.263 standard. Representative examples of the above-mentioned new standard are an MPEG-4 AVC (MPEG-4 Part 10: Advanced Video Coding) proposed by the ISO/IEC and the H.264 standard proposed by the ITU-T.

There must be developed a new method for encoding moving picture or moving images, such that it must maximize compression efficiency, and must suitably cope with a variety of terminals and variable communication environments. With the above-mentioned demands of the aforementioned enhanced encoding method, the JVT acting as a collaboration team of the ISO/IEC and the ITU-T is conducting intensive research into the standardization of Scalable Video Coding (SVC) based on H.264/AVC.

The scalable video coding (SVC) basically includes three scalability methods, i.e., temporal scalability, spatial scalability, and SNR scalability.

The spatial scalability has been executed by an inter-layer prediction process, and the SVC provides the increase of coding efficiency.

The above-mentioned inter-layer prediction calculates a high correlation between several layers, such that the overlapping information can be removed from the resultant images by an inter-layer prediction process. Therefore, a variety of prediction methods capable of performing the inter-layer prediction must be developed.

DISCLOSURE OF INVENTION

Technical Problem

An object of the present invention is to provide various method for decoding and encoding a video signal by inter layer prediction

Technical Solution

Reference will now be made in detail to the preferred embodiments of the present invention, examples of which are illustrated in the accompanying drawings.

The above-mentioned inter-layer prediction is classified into a texture prediction and a motion prediction.

The texture prediction is classified into an intra-base prediction and a residual prediction. The motion prediction is classified into a base mode, a base-mode refinement, and a motion prediction mode.

The above-mentioned intra-base prediction will be described in detail. If a lower-layer macroblock corresponding to a target macroblock to be encoded is encoded by an inter prediction mode, the above-mentioned intra-base prediction reconstructs the lower-layer macroblock, performs upsampling of the reconstructed macroblock at resolution of the target macroblock to be encoded, and uses the upsampling result as a prediction signal.

The above-mentioned residual prediction will be described in detail. If a lower layer macroblock corresponding to a target macroblock to be encoded is encoded by an inter-image prediction mode, such that the lower layer macroblock includes a residual signal, the above-mentioned residual prediction performs the inter layer prediction on the residual signal. Therefore, if motion information of a current macroblock is equal to or similar to that of the lower-layer macroblock, the residual prediction performs upsampling of the encoded lower-layer residual signal, and uses the upsampling result as a prediction signal of a current macroblock, such that it can remove the inter-layer overlapping information. The above-mentioned base mode will be described in detail. If a lower layer is present between at least two layers having different resolution, the base mode performs upsampling of motion information acquired form the lower layer without using a motion estimation within a current layer, and uses the upsampling resultant image.

A method for decoding/encoding a video signal using an inter-layer prediction process according to the present invention will hereinafter be described with reference to the annexed drawings.

FIG. 1 is a flow chart illustrating a method for decoding a video signal according to the present invention.

Referring to FIG. 1, the video-signal decoding method acquires a first prediction signal for a current block of an enhancement layer and a residual signal based on at least a base layer block at step S10. In other words, the video signal decoding method according to the present invention uses the inter layer prediction, such that it should be noted that the video-signal decoding method uses a first prediction signal for a current layer as a predictor signal capable of decoding a current macroblock and a residual signal based on a base layer block.

In this case, the first prediction signal for the current block can be generated by at least one prediction mode information from among the current block and the base layer block.

For example, the macroblock type of the current block is an inter macroblock, the prediction signal is generated by a motion vector of the current macroblock. If the macroblock type of the current block is an intra macroblock, the prediction signal is generated by an intra prediction mode of the current macroblock.

In this case, the intra prediction mode is indicative of one of prediction directions acquired when the prediction mode is performed by referring to neighboring macroblocks during the intra prediction encoding mode.

For example, the 4×4 pixel-unit intra prediction includes 9 modes according to 9 prediction directions. The higher the generation frequency of a corresponding prediction direction, the lower the allocation number of the corresponding prediction direction.

The residual signal based on the base layer block is indicative of a residual signal generated according to the macroblock types of macroblocks contained in the base layer.

In the meantime, a method for generating a second prediction signal as a representative example of the video-signal decoding method according to the present invention will hereinafter be described with reference to FIGS. 2~7.

The video-signal decoding method performs smoothing of the sum of the first prediction signal and the residual signal generated at step S10, and generates a second prediction signal for a current block at step S12.

The video signal decoding method reconstructs the current block by adding the second prediction signal and the residual signal at step S14. In other words, the video signal decoding method receives the residual signal for a current layer from an encoding unit, and adds the second prediction signal acting as a predictor and the residual signal, such that it reconstructs a current macroblock.

Also, the video signal decoding method performs smoothing-filtering of the second prediction signal, and adds the smoothing-filtered second prediction signal and the residual signal for the current layer, such that it can decode a current macroblock.

In this case, the term "smoothing-filtering" is indicative of a specific process for smoothing directivity of a prediction signal generated by the intra prediction mode.

FIG. 2 is a conceptual diagram illustrating the video signal decoding method of FIG. 1 according to the present invention.

Provided that the macroblock types of macroblocks contained in current and base layers are indicative of intra macroblocks, a method for generating a second prediction signal according to a first preferred embodiment of the present invention is depicted in FIG. 2.

Referring to FIG. 2, a first prediction signal 201 (Pc) is generated by an intra prediction mode of a macroblock of a current layer. In other words, the video-signal decoding method of FIG. 2 performs an intra prediction encoding process in a predetermined direction under the intra prediction mode, such that it acquires a prediction signal.

For example, if the intra prediction mode of the current layer macroblock indicates "2", the 4-4 pixel-unit intra prediction encoding process calculates an average value of eight pixels (i.e., four pixels of the left block and four pixels of the upper block), and generates a first prediction signal. The residual signal 203 (Rb) for the base layer is generated by the intra prediction mode of the macroblock of the base layer.

In other words, the video signal decoding method of FIG. 2 calculates a difference between the prediction signal generated by the intra prediction mode of the base layer macroblock and the base layer macroblock, and generates a residual signal 203 (Rb) for the base layer.

Finally, the second prediction signal 207 is generated by the sum of the upsampling signal 205 ($u$) and the first prediction signal 201 (Pc). The upsampling signal 205 ($u$) is generated by upsampling the residual signal 203 (Rb) for the base layer at resolution of the current layer.

In this case, according to the video signal decoding method according to the present invention, the current macroblock 213 (0c) adds the smoothing-filtering signal 209 of the second prediction signal 207 and the residual signal 211 (Rc) for the current layer, resulting in the implementation of the reconstruction of the current macroblock 213 (0c), as represented by an equation "0c=Rc+f(Pc+u(Rb))".

FIG. 3 is a conceptual diagram illustrating a video signal decoding method of FIG. 1 according to the present invention.

Provided that the macroblock types of macroblocks contained in current and base layers are indicative of intra macroblocks, a method for generating a second prediction signal according to the present invention is depicted in FIG. 3.

Referring to FIG. 3, a first prediction signal 301 (Pc) is generated by an intra prediction mode of a macroblock of a base layer, differently from the first prediction signal 201 of FIG. 2. The residual signal 303 (Rb) for the base layer and the second prediction signal 307 are generated by the same method as the video signal decoding method of FIG. 2.

In this case, the video signal decoding method according to the present invention reconstructs the current macroblock 313 (0c) by adding the smoothing-filtering signal 309 ($f$) of the second prediction signal 307 and the residual signal 311 (Rc) for the current layer, as represented by an equation "0c=Rc+f(Pc+u(Rb))".

In this case, in order to perform the video signal decoding method of FIG. 3, the video signal decoding method according to the present invention may use a new syntax, or may also use residual prediction flag information (residual_prediction_flag) or base mode flag information (base_mode_flag), etc.

FIG. 4 is a conceptual diagram illustrating a video signal decoding method of FIG. 1 according to the present invention.

Provided that the macroblock types of macroblocks contained in current and base layers are indicative of intra macroblocks and inter macroblocks, a method for generating a second prediction signal according to the present invention is depicted in FIG. 4.

Referring to FIG. 4, a residual signal 403 (Rb) for the base layer is generated by the inter prediction mode. In other words, the video signal decoding method of FIG. 4 calculates a difference between the prediction signal generated by the motion vector of the base layer macroblock and the base layer macroblock, thereby generating a residual signal 403 (Rb) for the base layer.

The first prediction signal 401 (Pc) and the second prediction signal 407 are generated by the same method as the video signal decoding method of FIG. 2.

In this case, the video signal decoding method according to the present invention reconstructs the current macroblock 413 (0c) by adding the smoothing-filtering signal 409 ($f$) of the second prediction signal 407 and the residual signal 411 (Rc) for the current layer, as represented by an equation "0c=Rc+f(Pc+u(Rb))".

FIG. 5 is a conceptual diagram illustrating a video-signal decoding method of FIG. 1 according to the present invention.

Provided that the macroblock types of macroblocks contained in current and base layers are indicative of intra macroblocks and inter macroblocks, a method for generating a second prediction signal according to the present invention is depicted in FIG. 5.

Referring to FIG. 5, a first prediction signal 501 (Pc) and a residual signal 503 (Rb) for the base layer are generated by the video signal decoding method of FIG. 5. Finally, the second prediction signal 509 is generated by upsampling the sum 507 of the downsampling signal 505 of the first prediction signal 501 (Pc) and the residual signal 503 (Rb) for the base layer at resolution of the current layer.

In this case, the video signal decoding method according to the present invention reconstructs the current macroblock 515 (0c) by adding the smoothing-filtering signal 513 (f) of the second prediction signal 509 and the residual signal 511 (Rc) for the current layer, as represented by an equation "0c=Rc+ f(u(d(Pc)+Rb))".

FIG. 6 is a conceptual diagram illustrating a video signal decoding method of FIG. 1 according to the present invention.

Provided that the macroblock types of macroblocks contained in current and base layers are indicative of inter macroblocks and intra macroblocks, a method for generating a second prediction signal according to the present invention is depicted in FIG. 6. Referring to FIG. 6, a first prediction signal 601 (Pc) is generated by a motion vector of a current layer macroblock. In other words, the first prediction signal 601 (Pc) is generated by the inter image prediction.

The residual signal 603 (Rb) for the base layer is generated by the intra prediction mode of the base layer macroblock. Finally, the second prediction signal 607 is generated by the sum of the upsampling signal 605 (u) and the first prediction signal 601 (Pc). In this case, the upsampling signal 605 is generated by upsampling the residual signal 603 (Rb) for the base layer at resolution of the current layer.

In this case, the video signal decoding method according to the present invention reconstructs the current macroblock 613 (0c) by adding the smoothing-filtering signal 609 (f) of the second prediction signal 607 and the residual signal 611 (Rc) for the current layer, as represented by an equation "0c=Rc+ f(Pc+u(Rb))".

FIG. 7 is a conceptual diagram illustrating a video signal decoding method of FIG. 1 according to the present invention.

Provided that the macroblock types of macroblocks contained in current and base layers are indicative of inter macroblocks and intra macroblocks, a method for generating a second prediction signal according to the present invention is depicted in FIG. 7.

Referring to FIG. 7, a first prediction signal 701 (Pc) and a residual signal 703 (Rb) for the base layer are generated by the video signal decoding method of FIG. 6. Finally, the second prediction signal 709 is generated by the same method as the video signal decoding method of FIG. 7.

In this case, the video signal decoding method according to the present invention reconstructs the current macroblock 715 (0c) by adding the smoothing-filtering signal 713 (f) of the second prediction signal 709 and the residual signal 711 (Rc) for the current layer, as represented by an equation "0c=Rc+ f(u(d(Pc)+Rb))".

FIG. 8 is a flow chart illustrating a method for encoding a video signal according to the present invention.

Referring to FIG. 8, the video signal encoding method according to the present invention generates a second prediction signal for the current layer using a first prediction signal and a residual signal for a base layer at step S80. In other words, the video signal encoding method according to the present invention uses an inter layer prediction method, such that it can be recognized that the first prediction signal for the current layer and the residual signal for the base layer are used as predictor signals for encoding the current macroblock.

In this case, the first prediction signal for the current layer is indicative of a prediction signal generated by the macroblock types of the current layer macroblock. If the macroblock type is indicative of the inter macroblock type, the video signal encoding method according to the present invention generates the prediction signal using a motion vector of the current macroblock. Otherwise, if the macroblock type is indicative of the intra macroblock type, the video signal encoding method according to the present invention generates the prediction signal by an intra prediction mode of the current macroblock.

Also, the residual signal for the base layer is indicative of a residual signal generated according to the macroblock types of macroblocks contained in the base layer.

A method for generating a second prediction signal according to a preferred embodiment of the video signal encoding method will hereinafter be described with reference to FIGS. 9□10.

Referring to FIG. 9□10, the video signal encoding method according to the present invention encodes the residual signal between the second prediction signal generated at step S80 and the current macroblock at step S82. In other words, the video signal encoding method encodes the residual signal between the second prediction signal acting as the prediction signal and the current macroblock, and transmits the resultant signal to a decoding unit.

The video signal encoding method according to the present invention performs smoothing-filtering of the second prediction signal, and can encode the residual signal between the smoothing-filtered second prediction signal and the current macroblock. In this case, the term smoothing-filtering is indicative of a specific process for smoothing directivity of a prediction signal generated by the intra prediction mode.

FIG. 9 is a conceptual diagram illustrating the video signal encoding method of FIG. 8 according to the present invention.

Provided that the macroblock types of macroblocks contained in current and base layers are indicative of intra macroblocks, a method for generating a second prediction signal according to the present invention is depicted in FIG. 9.

Referring to FIG. 9, a first prediction signal 901 (Pc) is generated by the intra prediction mode of the current layer macroblock 907. In other words, the video signal encoding method of FIG. 9 acquires the prediction signal by performing an intra prediction encoding process in a predetermined direction under the intra prediction mode.

The residual signal 903 (Rb) for the base layer is generated by the intra prediction mode of the base layer macroblock. In other words, the video signal encoding method of FIG. 9 calculates a difference between the prediction signal generated by the intraprediction mode of the base layer macroblock and the base layer macroblock, thereby generating the residual signal 903 (Rb) for the base layer. Finally, the second prediction signal 905 is generated by the sum of the upsampling signal (u) of the residual signal 903 (Rb) for the base layer and the first prediction signal 901 (Pc). In this case, the upsampling signal (u) is generated by upsampling the residual signal 903 at resolution of the current layer.

In this case, the video signal encoding method according to the present invention generates the residual signal 909 (Rc) by calculating a difference between the smoothing-filtering signal (f) of the second prediction signal 905 and the current macroblock, and is then encoded, as represented by an equation "Rc=0c−f(Pc+u(Rb))".

The prediction signal 905 is required for allowing the encoding unit to generate the residual signal 909. The video signal encoding method according to the present invention generates the prediction signal 905 by adding the intra prediction mode signal 901 of the current layer macroblock and the upsampling signal of the base layer residual signal 903, such that it can generate more accurate prediction signal, resulting in the increase of encoding efficiency. In this case, the upsampling signal is generated by upsampling the residual signal 903 for the base at resolution of the current layer.

FIG. 10 is a conceptual diagram illustrating a video signal encoding method of FIG. 8 according to the present invention.

Provided that the macroblock types of macroblocks contained in current and base layers are indicative of intra macroblocks, a method for generating a second prediction signal according to the present invention is depicted in FIG. 10.

Referring to FIG. 10, a first prediction signal 101 (Pc) and the residual signal 103 (Rb) for the base layer are generated by the intra prediction mode of the base layer macroblock. In other words, the video signal encoding method of FIG. 10 calculates a difference between the prediction signal generated by the intra prediction mode of the base layer macroblock and the base layer macroblock, such that it generates a residual signal 103 (Rb) for the base layer. According to the present invention, the first prediction signal 101 is generated by the intra prediction mode of the base layer macroblock, such that a correlation between the base layer macroblock and the current layer macroblock is high. Therefore, the video signal encoding method according to the present invention can generate more accurate predictor signal, resulting in the increase of coding efficiency.

Finally, the second prediction signal 105 is generated by adding the upsampling signal (u) and the first prediction signal 101 (Pc). The upsampling signal (u) is generated by upsampling the residual signal 103 (Rb) for the base layer at resolution of the current layer.

In this case, the video signal encoding method according to the present invention generates the residual signal 109 (Rc) by calculating a difference between the smoothing-filtering signal (f) of the second prediction signal 105 and the current macroblock, and is then encoded, as represented by an equation "Rc=0c−f(Pc+u(Rb))".

Flag information of the video signal decoding method of FIG. 10 can be encoded. In this case, a new syntax may be used as the flag information. Otherwise, residual prediction flag information (residual_prediction_flag) or base-mode flag information (base_mode_flag) can be used as the flag information.

A method for generating a first prediction signal, a residual signal for a base layer, and the second prediction signal using the video signal encoding method (not shown) corresponding to the video signal decoding method of FIGS. 4~7 are equal to those of FIGS. 4~7.

A weight prediction method (not shown) for an intra base prediction from among inter layer prediction methods will hereinafter be described in detail.

A video signal encoding method based on the intra-base prediction is as follows.

A weight (w) is added to the upsampling signal (B) of a current layer corresponding to the base layer macroblock, and an offset value (o) is added to the added to the multiplied result, such that a prediction signal for the current layer is generated. In this case, the weight may be the weight of a chromatic signal (chroma) or a luminescence signal (luma), and the offset value may be the offset value of the chromatic signal (chroma) or the luminescence signal (luma).

Finally, the video signal encoding method based on the intra base prediction encodes the residual signal (R) between the current layer prediction and the current layer macroblock (S), as represented by an equation "R=S−(B*w+o)". Also, the video signal encoding method based on the intra base prediction can encode the flag information indicating the above-mentioned prediction method, and can also encode weight and offset value information.

In this case, a new syntax i.e., a weighted intra base prediction flag (weighted_intra_base_prediction_flag) may be defined as the flag information indicating the prediction method.

For example, if the weighted intra base prediction flag (weighted_intra_base_prediction_flag) is indicative of "1", this indicates that the weight and offset values of the luminescence signal and the chromatic signal are applied to the intra base prediction. If the weighted intra base prediction flag (weighted_intra_base_prediction_flag) is indicative of "0", this indicates that the weight and offset values of the luminescence signal and the chromatic signal are not applied to the intra base prediction.

Also, the weight information of the luminescence signal and the chromatic signal may be a weight itself, and the offset value information of the luminescence signal and the chromatic signal may be an offset value itself. Otherwise, the weight information and the offset value information may also be indicative of specific information capable of acquiring weight and offset values.

A video signal decoding method based on intra base prediction is as follows.

The above-mentioned video signal decoding method based on intra base prediction calculates the weight (w) and the offset value (o) using the weight and offset value information according to the weighted intra-base prediction flag (weighted_intra_base_prediction_flag).

For example, if the weighted intra base prediction, flag (weighted_intra_base_prediction_flag) is indicative of "1", this indicates that the weight and offset values of the luminescence signal and the chromatic signal are applied to the intra base prediction. If the weighted intra base prediction flag (weighted_intra_base_prediction_flag) is indicative of "0", this indicates that the weight and offset values of the luminescence signal and the chromatic signal are not applied to the intra-base prediction.

The above-mentioned video signal decoding method based on intra base prediction generates a prediction signal for a current layer using the calculated weight (w) and the offset value (o).

Finally, the above-mentioned video signal decoding method based on intra base prediction adds the prediction signal for the current layer and the residual signal (R), and decodes the macroblock (S) of the current layer, as represented by an equation "S=R+(B*w+o)".

Therefore, the above-mentioned method for decoding/encoding a video signal using the intra base prediction reduces a difference in brightness between a current layer image and a base layer image, if the base layer image performs downsampling of the current layer image or the current layer image is captured by another camera.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Advantageous Effects

A method for decoding/encoding a video signal using an inter layer prediction process according to the present invention uses a variety of inter layer prediction methods according to the macroblock types of macroblocks of the current and base layers, and removes inter layer redundancy, resulting in increased coding efficiency.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
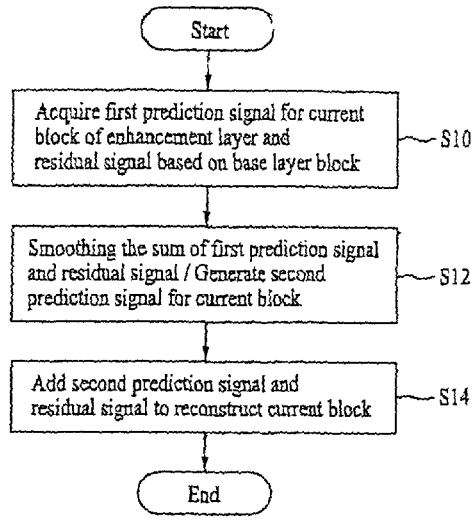
FIG. 1 is a flow chart illustrating a method for decoding a video signal according to the present invention.
Figure 2:
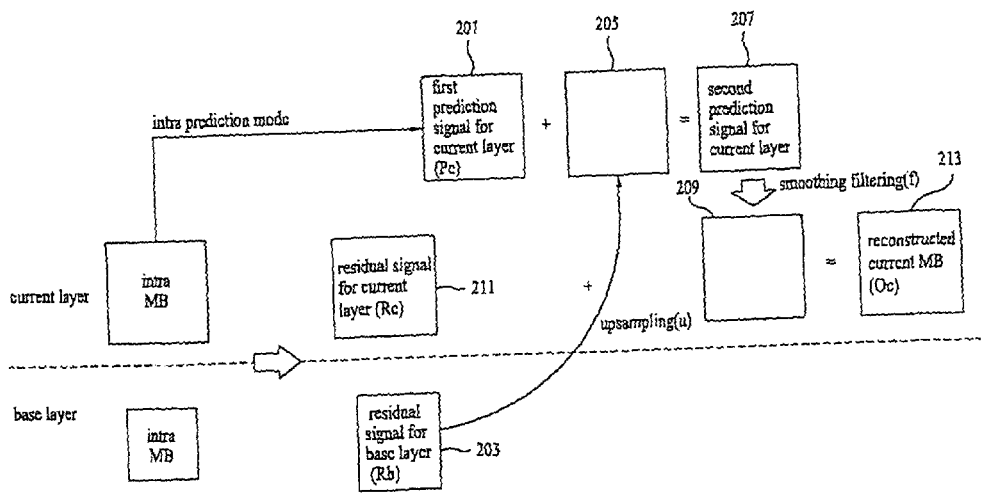
FIGS. 2~7 are conceptual diagrams illustrating the video signal decoding method shown in FIG. 1 according to the present invention.
Figure 3:
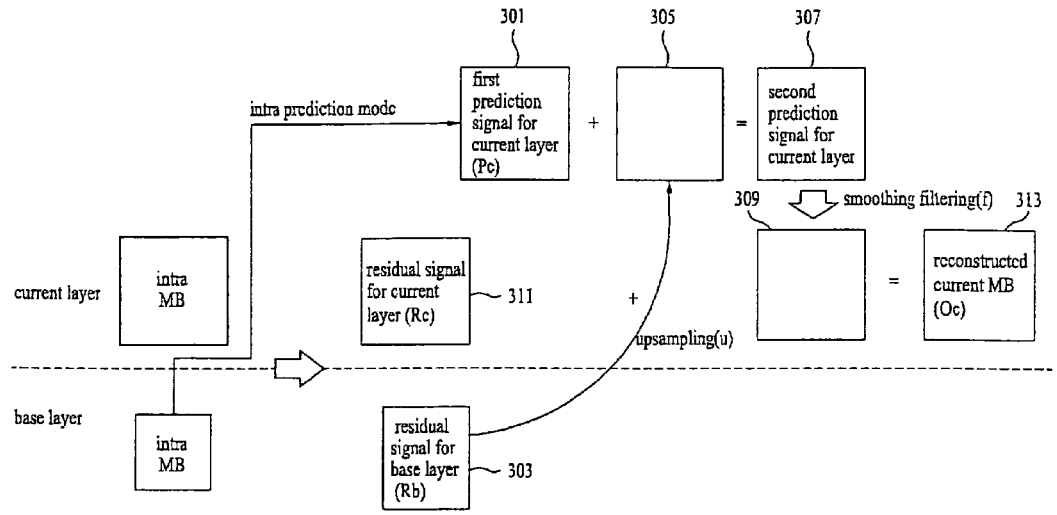
Figure 4:
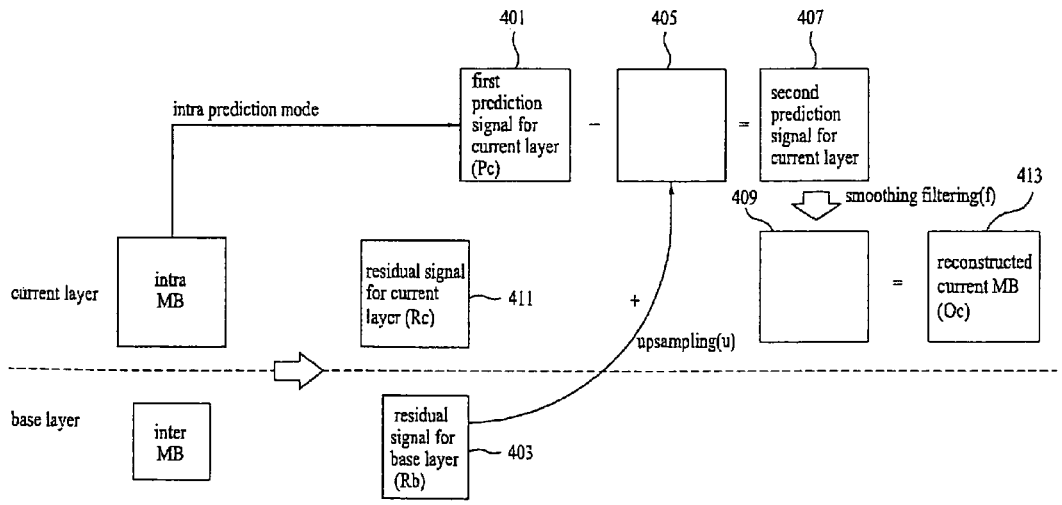
Figure 5:
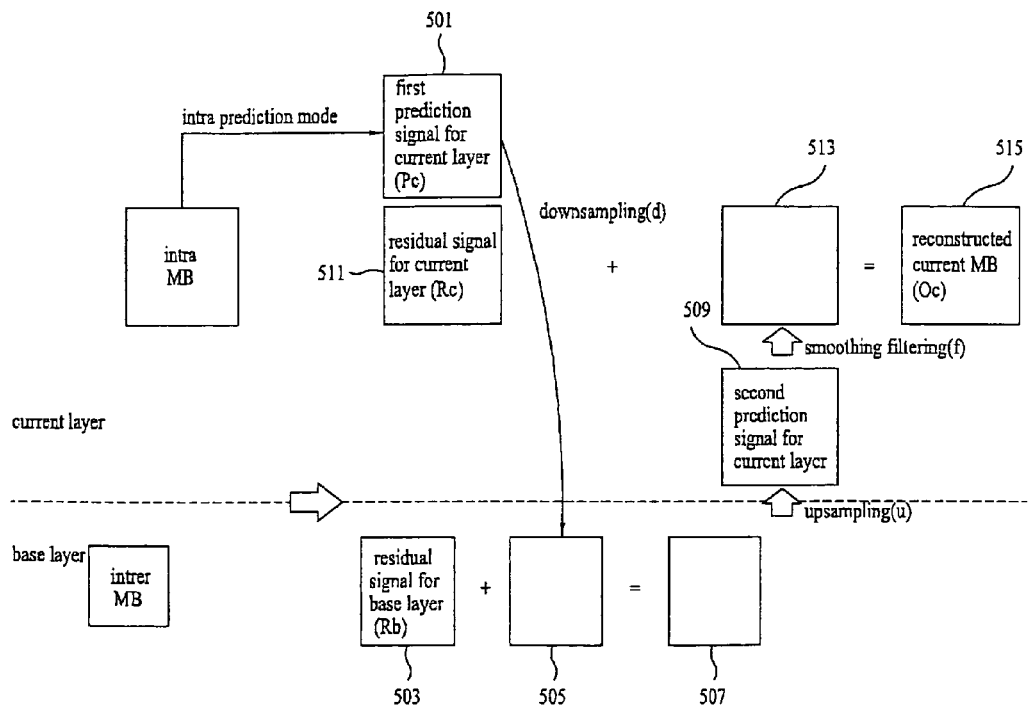
Figure 6:
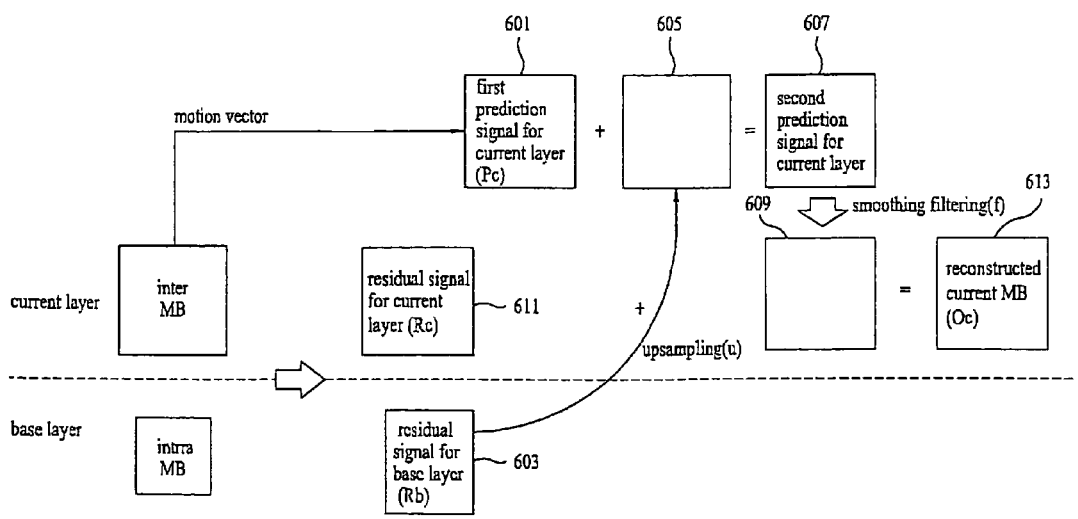
Figure 7:
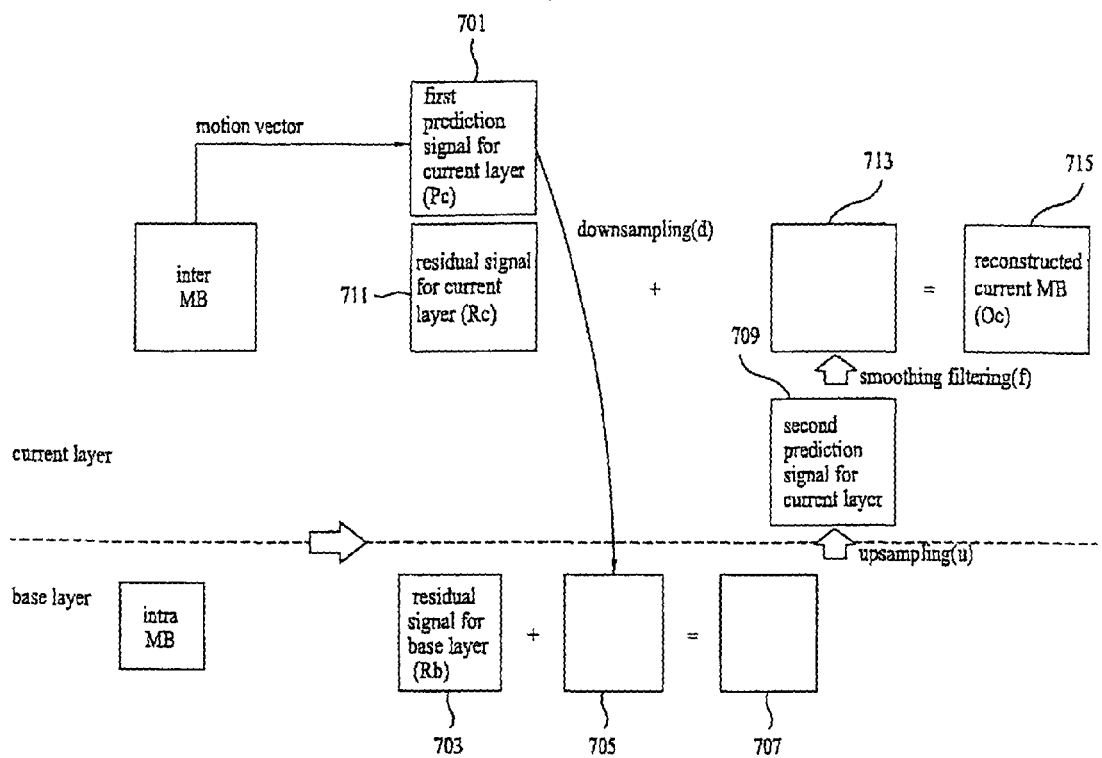
Figure 8:
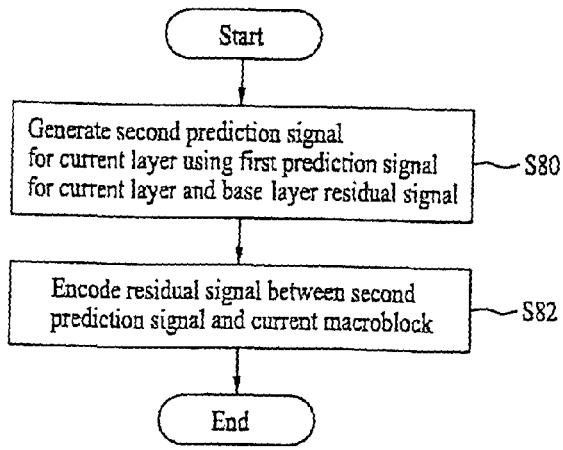
FIG. 8 is a flow chart illustrating a method for encoding a video signal according to the present invention.
Figure 9:
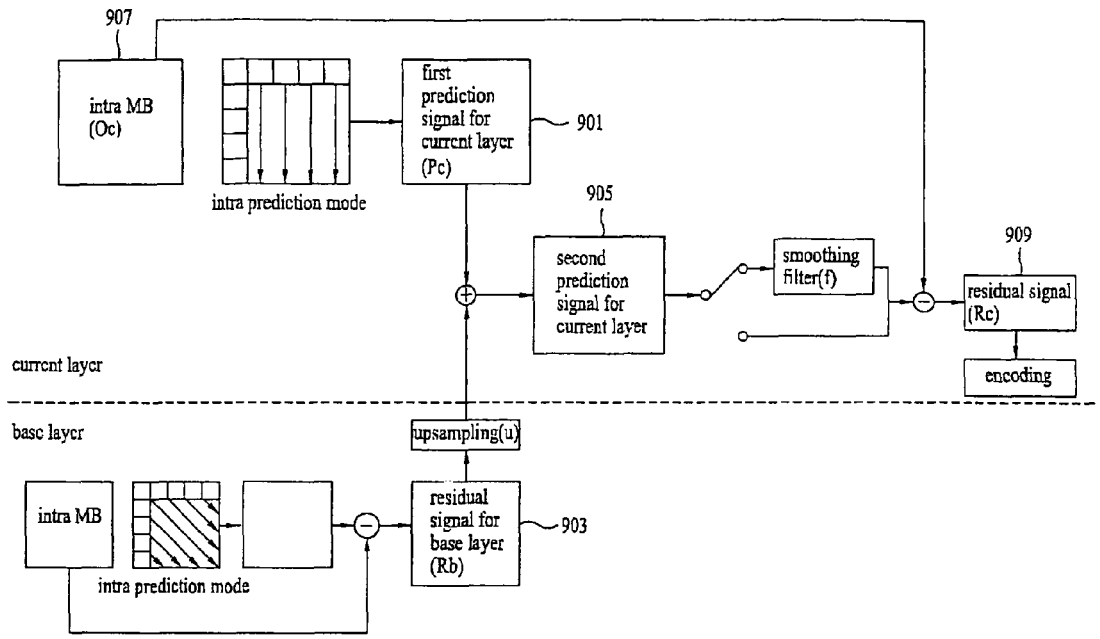
FIGS. 9~10 are conceptual diagrams illustrating the video-signal encoding method shown in FIG. 8 according to the present invention.
Figure 10:
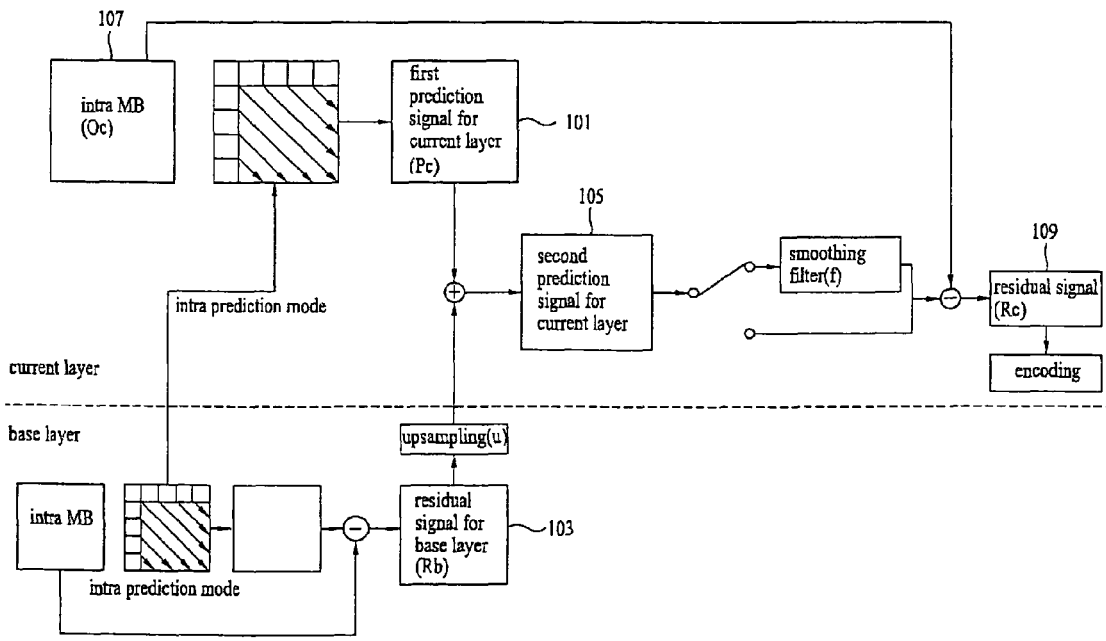

Accordingly, the present invention is directed to a method for decoding/encoding a video signal using an inter layer prediction method that substantially obviates one or more problems due to limitations and disadvantages of the related art.

An object of the present invention devised to solve the problem lies on a method for decoding/encoding a video signal using an inter layer prediction process.

The object of the present invention can be achieved by providing a method for generating a method for decoding a video signal including several layer information comprising: a) acquiring a first prediction signal for a current block of an enhancement layer and a residual signal based on at least a base layer block; b) smoothing the sum of the first prediction signal and the residual signal, and generating a second prediction signal for the current block; and c) reconstructing the current block based on the second prediction signal.

In another aspect of the present invention, there is provided a method for encoding a video signal including several layer information comprising: a) generating a second prediction signal for a current layer using a first prediction signal for the current layer and a residual signal for a base layer; and c) encoding a residual signal between the second prediction signal and a current macroblock.

INDUSTRIAL APPLICABILITY

As apparent from the above description, a method for decoding/encoding a video signal using an inter-layer prediction process according to the present invention employs a variety of inter-layer prediction methods according to the types of macroblocks of the current and base layers, and removes inter-layer redundancy, resulting in increased coding efficiency.

What is claimed:

1. A method for decoding a video signal performed with a decoding apparatus, comprising:
   obtaining, with the decoding apparatus, a residual signal of a corresponding block in a base layer from a base layer bitstream;
   scaling, with the decoding apparatus, the residual signal of the corresponding block in the base layer;
   obtaining, with the decoding apparatus, a residual signal of a current block in an enhanced layer from an enhanced layer bitstream;
   obtaining, with the decoding apparatus, a prediction pixel value of the current block in the enhanced layer based on an intra prediction mode of the corresponding block in the base layer and a pixel value of a neighboring block in the enhanced layer, the neighboring block being adjacent to the current block; and
   reconstructing, with the decoding apparatus, the current block by using the prediction pixel value of the current block, the residual signal of the current block, and the scaled residual signal of the corresponding block.

2. The method of claim 1, wherein the current block is reconstructed by adding the residual signal of the current block and the scaled residual signal of the corresponding block to the prediction pixel value of the current block.

3. The method of claim 1, wherein a spatial resolution of the base layer is the same as a spatial resolution of the enhanced layer, and an image quality of the base layer is different from an image quality of the enhanced layer.

4. The method of claim 3, wherein the image quality of the base layer is lower than the image quality of the enhanced layer,
   wherein the image quality is based on a quantization step size.

5. The method of claim 1, wherein the residual signal of the corresponding block corresponds to a transform coefficient level.

* * * * *

UNITED STATES PATENT AND TRADEMARK OFFICE
CERTIFICATE OF CORRECTION

PATENT NO. : 8,498,337 B2
APPLICATION NO. : 12/926099
DATED : July 30, 2013
INVENTOR(S) : Seung Wook Park et al.

It is certified that error appears in the above-identified patent and that said Letters Patent is hereby corrected as shown below:

On the title page, item (63) should read

Related U.S. Application Data

(63) Provisional Application No. 60/723,474, filed October 5, 2005, provisional application No. 60/729,220, filed October 24, 2005, Continuation of application No. 11/992,942, filed as application No. PCT/KR2006/004029 on Oct. 9, 2006, now abandoned.

Signed and Sealed this
Fourth Day of March, 2014

Michelle K. Lee
*Deputy Director of the United States Patent and Trademark Office*